United States Patent
Shimomura

[11] Patent Number: 6,149,502
[45] Date of Patent: *Nov. 21, 2000

[54] CRANKSHAFT MACHINING METHOD

[75] Inventor: Masumi Shimomura, Ishikawa-ken, Japan

[73] Assignee: Komatsu Machinery Corp., Komatsu-shi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/969,914

[22] Filed: Nov. 13, 1997

[30] Foreign Application Priority Data

Nov. 21, 1996 [JP] Japan ................................. 8-310428

[51] Int. Cl.$^7$ .................................................. B24B 1/00
[52] U.S. Cl. .......................... 451/49; 451/399; 451/249
[58] Field of Search .............................. 451/49, 142, 249, 451/399, 324

[56] References Cited

U.S. PATENT DOCUMENTS

| | | | |
|---|---|---|---|
| 2,571,779 | 10/1951 | Stodgell | 51/241 |
| 3,603,183 | 9/1971 | Walker | 82/4 B |
| 4,110,055 | 8/1978 | Blaimschein et al. | 408/203.5 |
| 4,269,551 | 5/1981 | Kralowetz | 409/132 |
| 5,551,814 | 9/1996 | Hazama | 409/200 |
| 5,647,705 | 7/1997 | Shimomura | 409/132 |
| 5,725,339 | 3/1998 | Yoshita | 409/132 |
| 5,769,578 | 6/1998 | Shimomura | 409/82 |
| 5,829,930 | 11/1998 | Shimomura | 409/134 |
| 5,980,171 | 11/1999 | Shimomura | 409/132 |

FOREIGN PATENT DOCUMENTS 6-320319  11/1994  Japan .

*Primary Examiner*—Timothy V. Eley
*Assistant Examiner*—Dung Van Nguyen
*Attorney, Agent, or Firm*—Frishauf, Holtz, Goodman, Langer & Chick, P.C.

[57] ABSTRACT

A crankshaft machining apparatus for use in machining a crankshaft from a workpiece, includes: a bed; a pair of work heads mounted on the bed for fixedly supporting the workpiece to be machined at both ends thereof, respectively; at least one cutter head disposed between the work heads so as to be displaceable in an axial direction of the workpiece; and an inside edge cutter mounted on a said cutter head for cutting in the workpiece simultaneously a pair of counter weights of the crankshaft along their respective outer peripheries, the counter weights being located at both ends of a pin journal of the crankshaft, respectively. This arrangement has the ability to form the outer peripheries of a pair of counter weights simultaneously, and provides a markedly enhanced machining efficiency.

8 Claims, 11 Drawing Sheets

○ RIGHT SIDE CUTTER HEAD ACTIVE
✗ RIGHT SIDE WORK REST ACTIVE

○ RIGHT SIDE CUTTER HEAD ACTIVE

⋈ RIGHT SIDE WORK REST ACTIVE

- LEFT SIDE CUTTER HEAD ACTIVE
- ⋈ LEFT SIDE WORK REST ACTIVE
- ○ RIGHT SIDE CUTTER HEAD ACTIVE
- ⋈ RIGHT SIDE WORK REST ACTIVE

- ● LEFT SIDE CUTTER HEAD ACTIVE
- ⋈ LEFT SIDE WORK REST ACTIVE
- ○ RIGHT SIDE CUTTER HEAD ACTIVE
- ⋈ RIGHT SIDE WORK REST ACTIVE

- ● LEFT SIDE CUTTER HEAD ACTIVE
- ⋈ LEFT SIDE WORK REST ACTIVE
- ○ RIGHT SIDE CUTTER HEAD ACTIVE
- ⋈ RIGHT SIDE WORK REST ACTIVE

● LEFT SIDE CUTTER HEAD ACTIVE

✗ LEFT SIDE WORK REST ACTIVE

○ RIGHT SIDE CUTTER HEAD ACTIVE

✗ RIGHT SIDE WORK REST ACTIVE

CRANKSHAFT MACHINING METHOD

TECHNICAL FIELD

The present invention relates to a crankshaft machining apparatus for machining from a workpiece to a crankshaft having pin journals, counter weights and main journals, and in particular to a crankshaft machining apparatus which is capable of cutting the counter weights along their outer peripheries in the workpiece.

BACKGROUND ART

In the field of machining a crankshaft which is commonly used as a part of an engine and so forth, it has hitherto been known to machine a pin journal or a main journal of the crankshaft by using a crankshaft miller that is typically unavailable to machine the outer periphery of a counter weight and the other components of the crankshaft. Then, since the outer periphery of the counter weight and so forth have to be machined separately by means of a machine tool such as a lathe, it has hitherto been a common recognition that a multiple number of process steps are required in machining a crankshaft, thus rendering its productivity significantly low.

In order to overcome such an inconvenience, Japanese Unexamined Patent Publication No. Hei 6-320319 has proposed a crankshaft miller arrangement which enables the periphery of a counter weight in a crankshaft to be machined with a cutter for machining a main journal of the crankshaft.

The crankshaft miller system disclosed in the above mentioned publication is constituted of a bed, a pair of work heads which are mounted on the bed and adapted to support one end and the other of a workpiece to be machined, respectively, and a pair of cutter units disposed between these work heads so as to be movable in the longitudinal direction of the workpiece. One of these cutter units is provided with a cutter for machining a pin journal as well as a rest unit operative, when the pin journal is machined with the cutter, to clamp a main journal adjacent to the pin journal, and the other cutter unit is provided with a cutter for machining the main journal as well as a rest unit for clamping a main journal adjacent to one of a pair of counter weights the other of which can be machined with the main journal machining cutter. This arrangement, with the ability to machine the outer periphery of such a counter weight with the main journal machining cutter, has been recognized to be effective to reduce the number of machining process steps as compared with a case where it can be machined only in a separate process step by using a lathe or the like, hence enhancing the productivity to prepare a machined crankshaft.

Because of the need to machine the outer periphery of a counter weight one by one with the main journal machining cutter, it has been found, however, that the crankshaft miller system disclosed in the above mentioned publication makes it necessary for a prolonged time period to be expended in machining a single crankshaft, thus giving rise to the inconvenience of a reduced machining efficiency.

With the view to eliminating such inconveniences as encountered in the prior art, it is an object of the present invention to provide a crankshaft machining apparatus that makes it possible for a pair of counter weights of a given crankshaft to be simultaneously machined in their respective outer peripheries, thereby enhancing the efficiency of the process of machining a crankshaft.

SUMMARY OF THE INVENTION

In order to achieve the above mentioned object, there is provided in accordance with the present invention in a first aspect thereof a crankshaft machining apparatus for use in machining a crankshaft from a workpiece, which apparatus comprises: a bed; a pair of work heads mounted on the said bed for fixedly supporting the workpiece to be machined at both ends thereof, respectively; at least one cutter head disposed between the said work heads so as to be displaceable in an axial direction of the workpiece; and an inside edge cutter mounted on a said cutter head for cutting in the workpiece simultaneously a pair of counter weights of the said crankshaft along their outer peripheries, the said counter weights being located at both ends of a pin journal of the crankshaft, respectively.

According to the construction described above having the ability to form simultaneously a pair of counter weights of a crankshaft along their peripheries, the counter weights being located at both ends of each pin journal thereof, it can be seen and should be understood that there is achieved a marked reduction in the time period required for machining, as compared with a case in which each individual counter weight is cut, machined and formed along its outer periphery.

There is here also achieved an enhancement in the machining efficiency in preparing a crankshaft as well as an enhancement in its productivity and an improvement in the machining accuracy, as compared with a case where a plurality of counter weights are cut, machined and formed one by one.

The present invention also provides in a second aspect thereof a crankshaft machining apparatus for use in machining a crankshaft from a workpiece, which apparatus comprises: a bed; a pair of work heads mounted on the said bed for fixedly supporting the workpiece to be machined at both ends thereof, respectively; a pair of cutter heads disposed between the said work heads so as to be displaceable independently of each other in an axial direction of the said workpiece; a first inside edge cutter mounted on a first of said cutter heads for cutting in the workpiece simultaneously a pair of counter weights of the said crankshaft along their respective outer peripheries, the said counter weights being located at both ends of a pin journal of the crankshaft, respectively; and a second inside edge cutter mounted on a second of the said cutter heads for cutting in the workpiece at least one of a pin journal and a main journal of the crankshaft.

According to the above mentioned construction which enables the outer periphery of a pin journal or a main journal and the outer peripheries of a pair of counter weights to be cut, machined and formed simultaneously with a single machining apparatus, it can be seen and should be understood that there is achieved here a marked reduction in the cost of installation and the numbers of process steps in preparing a crankshaft, hence a marked enhancement in its productivity, as compared with a case where these outer peripheries are machined separately by means of separate machine tools.

In accordance with an important concomitant feature of the present invention, it should be noted that in either the first or second aspect thereof the said first inside edge cutter comprises a pair of cutter members which are spaced apart from each other by a spacing that is approximately equal to a spacing between the said counter weights.

According to the above described construction, it can be seen and should be understood that not only are a pair of counter weights which are respectively located at both side of a pin journal cut, machined and formed with an enhanced precision, but also the time expended in inside cutter indexing can be drastically shortened since no more than a single indexing step is required to this end.

In accordance with a further important concomitant feature of the present invention, the said inside cutter members have a substantially equal inner diameter and have an edge width that is a bit greater than the width of a said counter weight.

According to the above mentioned construction, it can be seen and should be understood that not only is the step of indexing a said inside edge cutter to a machining position facilitated, but also there arises no fear that an unmachined portion may be developed in the outer peripheral surface of a said counter weight.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

BEST MODES FOR CARRYING OUT THE INVENTION

Hereinafter, suitable embodiments of the present invention with respect to a crankshaft machining apparatus will be set forth in detail with reference to the accompanying drawings hereof.

Figure 1:
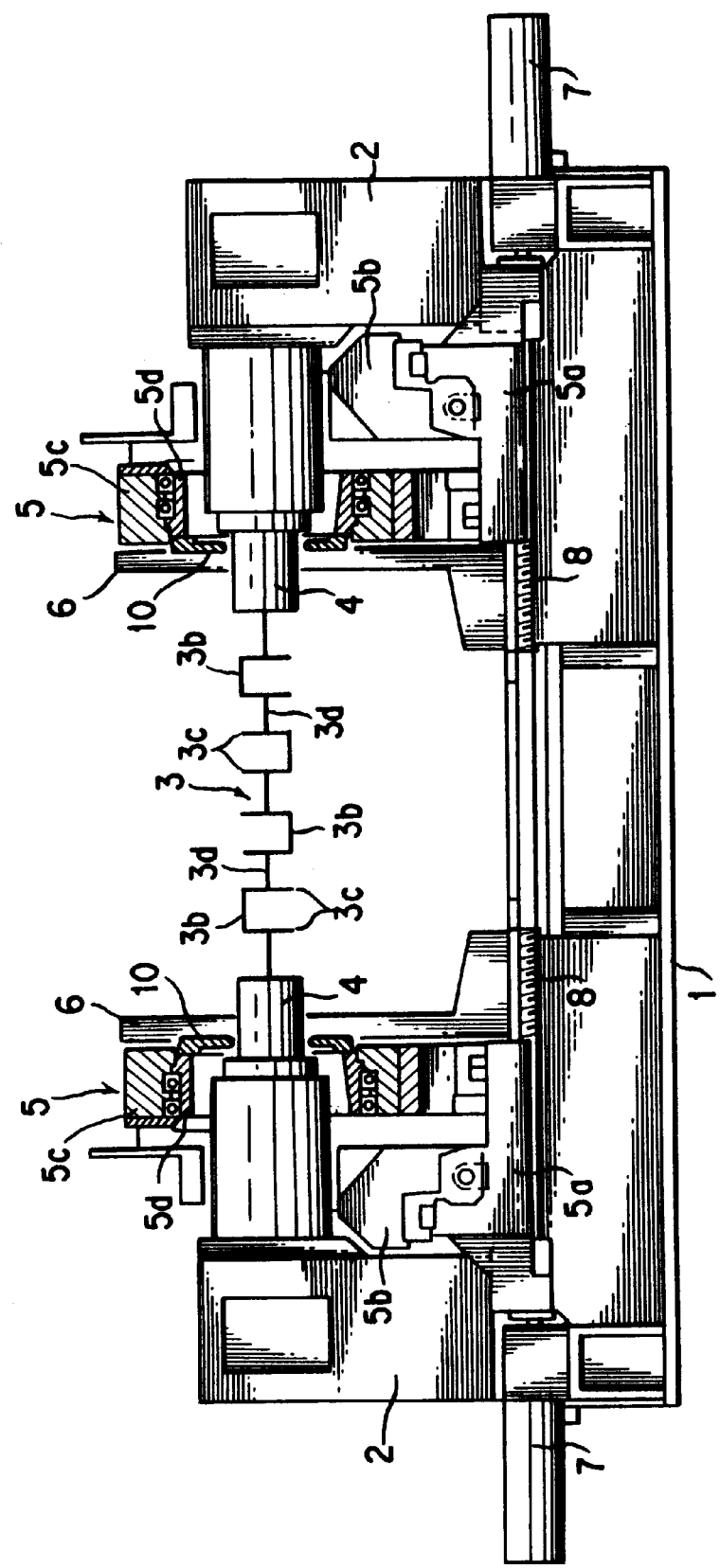
FIG. 1 is front view, partially cut away, that shows a crankshaft machining apparatus which represents a certain embodiment of the present invention.
Figure 2:
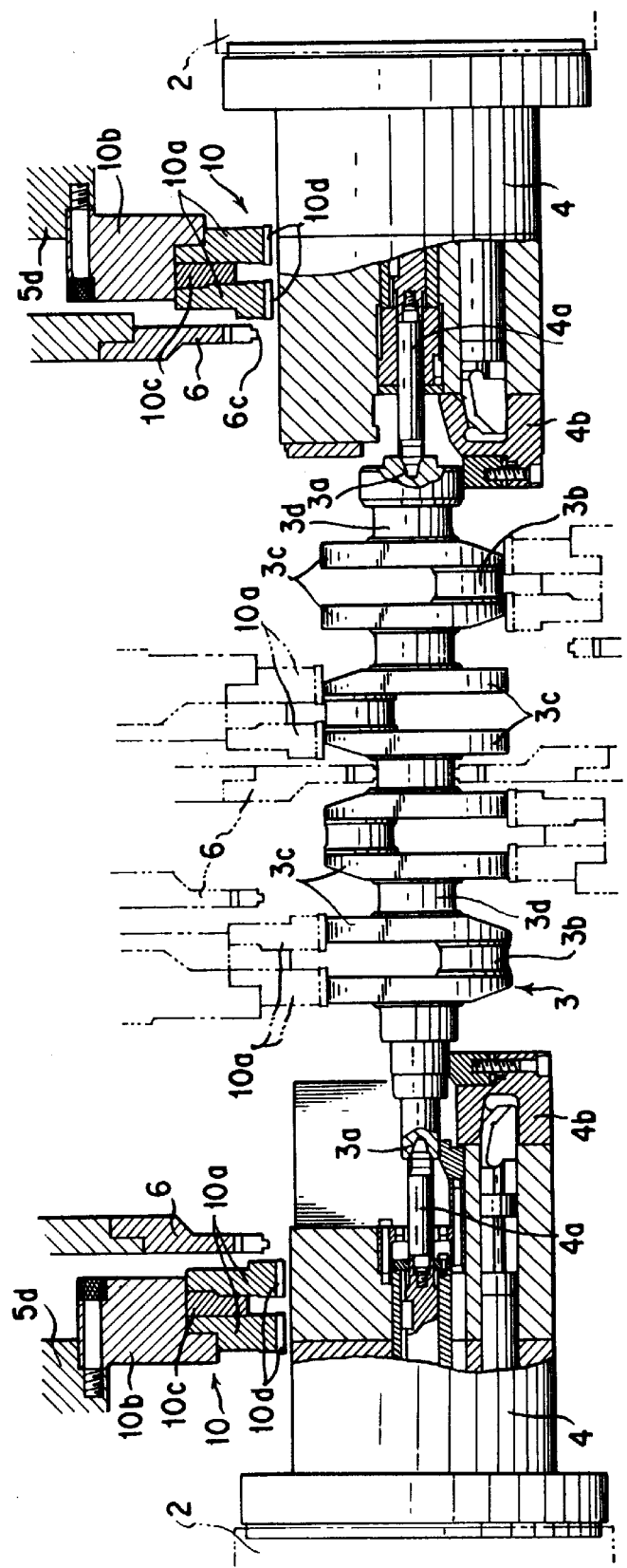
FIG. 2 is an enlarged view, partially cut away, that shows how the apparatus is arranged in the vicinity of chucks.

In FIG. 1, there is shown a crankshaft machining apparatus according to the present invention, in which a pair of work heads 2 are mounted on a bed 1 so as to be displaceable in a direction in which they come together and are spaced apart from each other. These work heads 2 are provided, as mounted to their respective opposing faces, with a pair of chucks 4 for clamping a workpiece 3 to be machined, at its respective ends.

Each of the chucks 4 includes a center 4a adapted for fitting in a center bore 3a preliminarily formed in each of both ends of the workpiece 3, and three claw members 4b adapted for clamping the workpiece 3 at each end thereof from three directions and holding it against rotating.

As shown in FIG. 1, it will be seen that between the above mentioned work heads 2 there are arranged a pair of cutter heads 5 and a pair of work rests 6 each adjacent to each of the cutter heads 5, respectively, so that both each of the cutter heads 5 and each of the work rests 6 may be displaceable in a direction in which each of the work heads 2 can be displaced, respectively.

The above mentioned cutter heads 5 are provided with a pair of saddles 5a, respectively, which are arranged so as to be displaceable independently of each other in the directions in which the work heads 2 can be displaced, by being driven via a pair of lead screws 8 by a pair of drive motors 7 mounted at both ends of the bed 1, respectively. These saddles 5a have mounted thereon, respectively, a pair of slides 5b which are displaceable in the directions orthogonal to the direction in which each of the saddles 5a extends.

Each of the slides 5b is provided with a swing arm 5c that is adapted to be vertically swung by a swing mechanism known in the art and not here shown. Each of the swing arms 5c has an inside edge cutter 10 supported thereon as rotatable via a cutter drum 5d so that it may while being rotated act to cut in the workpiece 3 simultaneously a pair of counter weights 3c of a crankshaft along their outer peripheries, each of the counter weights 3c being located respectively at both ends of each pin journal 3b of the crankshaft and having their outer peripheries machined.

Figure 4:
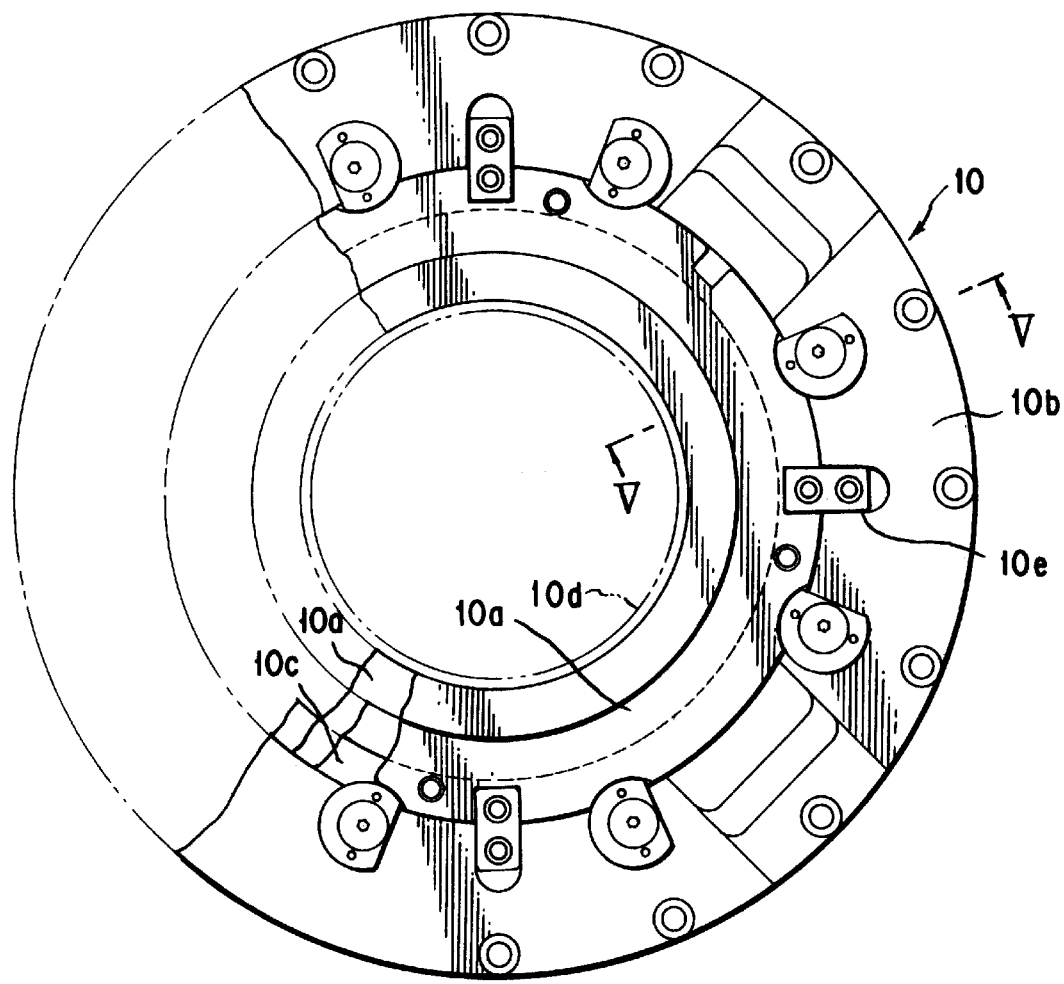
FIG. 4 is an enlarged view of an or each inside edge cutter that can be provided in the apparatus to cut, machine or form a pair of counter weights of a crankshaft in a workpiece.
Figure 5:
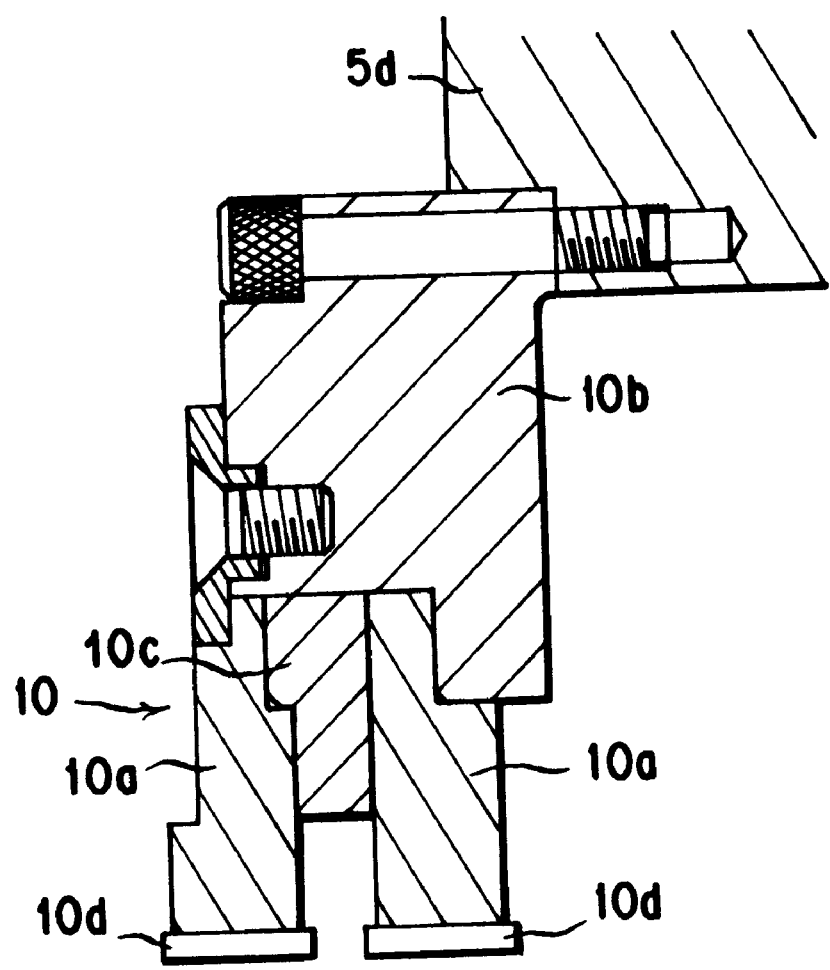
FIG. 5 is a cross sectional view taken along the line V—V in FIG. 4.

Such an inside edge cutter 10 comprises, as shown in FIGS. 4 and 5, a pair of cutter bodies or members 10a and a cutter adapter 10b which is detachably coupled to the cutter drum 5d which in turn is rotatably supported on the swing arm 5c, and is designed to be rotated by a cutter motor not shown.

The cutter adapter 10b is configured in the form of a ring and has an inner periphery to which the pair of cutter members 10a coupled together via a spacer seat 10c are attached. And, the cutter members 10a are spaced apart by a distance that is set to be substantially equal to the spacing between the adjacent counter weights 3c so that the outer peripheries of the latter located at both ends of each of successive pin journals 3b may be simultaneously cut.

The inner peripheral surface of each of the cutter members 10a has a multiplicity of abrasive tips 10d attached thereto which are circumferentially equally spaced apart. These tips 10d has a tip or edge width which is set to be a bit greater than the width of a said counter weight 3c.

It should be noted at this point that at 10e in FIG. 4 there is shown a positioning key that is designed to act to position the cutter adapter 10b and that has a function to transfer a rotation of the cutter drum 5d to the cutter members 10a when the workpiece 3 is cut and machined thereby.

Figure 3:
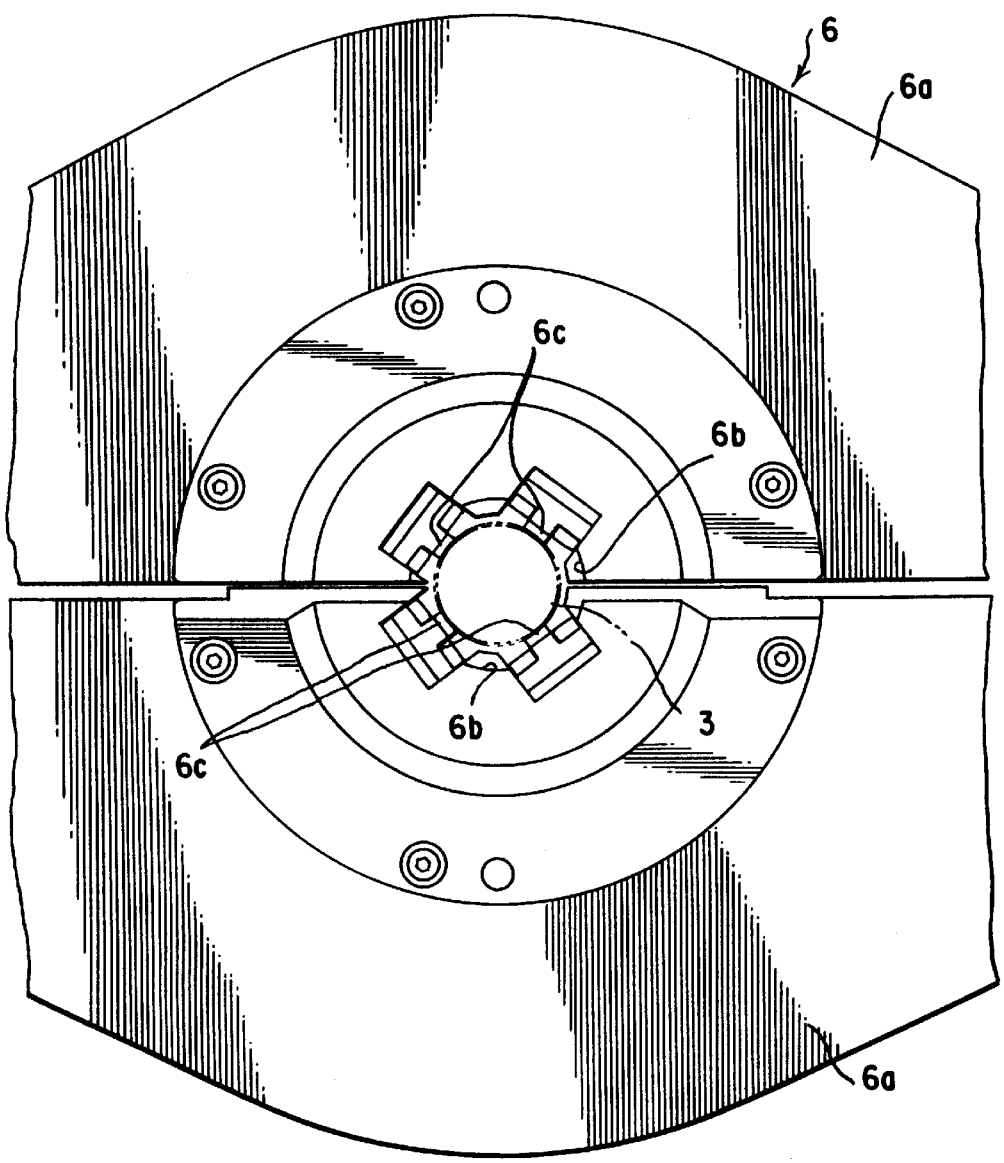
FIG. 3 is an enlarged view that shows a or each of work rests which can be provided in the apparatus.

Each of the work rests 6 includes, as shown in FIG. 3, a pair of rest arms 6a, respectively, that is adapted to be opened and closed vertically. Each of the opposing surfaces of the rest arms 6a has a semi-circular recess 6b that in turn has a pad 6c attached thereto for supporting from four directions a main journal 3d adjacent to one of the paired counter weights 3c to be simultaneously formed by the machining of the workpiece 3 with the inside edge cutter 10.

An explanation will now be given with respect to various modes of operation of the apparatus shown and described.

Figure 6:
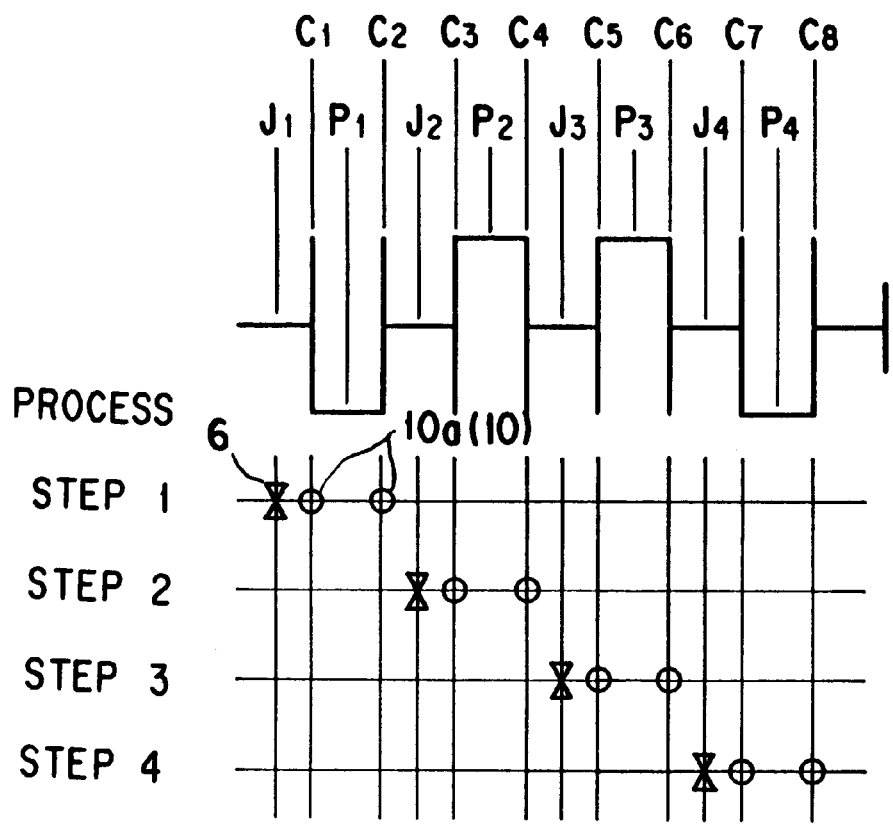
FIG. 6 is an explanatory view that illustrates an operation of the apparatus.

FIG. 6 diagrammatically shows the steps of a process of machining from a workpiece 3 a crankshaft for a four cylinder engine by rendering only one (right hand side) cutter head 5 active and operative. The process is also adopted in a case where the crankshaft machining apparatus is modified to include only a single cutter head 5.

The process is generalized by a method of machining from a workpiece 3 a crankshaft having pin journals 3b, counter weights 3c and main journals 3d, which method comprises the steps of: fixedly supporting the workpiece at both ends thereof with a pair of work heads 2, respectively, which are mounted on a bed 1; providing at least one cutter head 5 between said work heads so as to be displaceable in an axial direction of the workpiece; and cutting simultaneously a predetermined pair of portions of said workpiece along their outer peripheries so as to form simultaneously a pair of counter weights 3c of the crankshaft located at both ends of each pin journal 3b thereof, respectively, and between main journals 3d. Here, a pair of portions of the workpiece 3 are simultaneously cut to form a pair of counter weights 3c having their outer peripheries machined by using a single inside edge cutter 10 with a pair of cutter members 10a.

Thus, a workpiece 3 to be machined will first be loaded between a pair of the chucks 4. Then, the workpiece 3 will be clamped at its both ends by the claw members 4b of the chucks 4 and be fixed thereby in position. Then, a first main journal J1 will be supported by a work rest 6, and the inside edge cutter 10 will be positioned across a predetermined pair of portions of the workpiece 3 which correspond to a first counter weight C1 and a second counter weight C2 which are paired at both sides of a first pin journal P1 and will then be rendered active to cut simultaneously that predetermined pair of portions along their outer peripheries to form simultaneously the first counter weight C1 and the second counter weights C2 which are paired, having their respective outer peripheries machined.

After the first and second counter weights C1 and C2 which are paired have been cut, machined and formed along their outer peripheries in the first process step, the work rest 6 will be displaced to support a second main journal J2, and the inside edge cutter 10 will be displaced to engage across a next predetermined pair of portions of the workpiece 3 which correspond to a third counter weight C3 and a fourth counter weight C4 which are paired at both ends of a second pin journal P2 and will then be rendered active to cut simultaneously that next predetermined pair of portions of the workpiece along their respective outer peripheries to form simultaneously the third and fourth counter weights C3 and C4 which are paired in the second process step, having their respective outer peripheries machined.

With such a process step repeated, the fifth and sixth counter weights C5 and C6 which are paired will be cut simultaneously along their respective outer peripheries in the third step and the seventh and eighth counter weights C7 and C8 will be cut simultaneously along their respective outer peripheries in the fourth process step. In this manner, there ensues a marked reduction in the time period expended in preparing a crankshaft with successive pairs of center weights.

The process described is generalized by a method in which the crankshaft has a plurality of main journals preliminarily machined and a plurality of such pairs of counter weights and which comprises the steps of: a) supporting a said main journal with a work rest while cutting such a predetermined pair of portions with the single inside edge cutter to form a pair of counter weights; b) shifting the work rest to a next main journal and the single inside edge cutter to a next predetermined pair of portions of the workpiece and thereafter supporting the next main journal with the work rest while cutting the next predetermined pair of portions of the workpiece to form a next pair of counter weights of the crankshaft with their respective outer peripheries machined; and c) repeating the step b).

Figure 7:
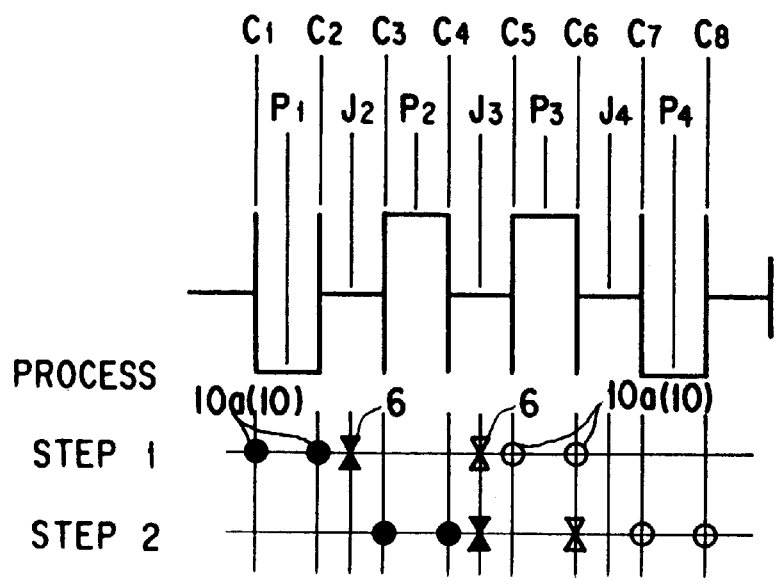
FIG. 7 is an explanatory view that illustrates an operation of the apparatus.

FIG. 7 diagrammatically shows the steps of a process of machining from a workpiece 3 a crankshaft by rendering both the right hand side and left hand side cutter head 5 active and operative to provide a pair of counter weights 3c in the crank shaft. In this process, the first and second counter weights C1 and C2 which are paired and the fifth and sixth counter weights C5 and C6 which are paired will be cut simultaneously along their respective outer peripheries in the first process step, and the third and fourth counter weights C3 and C4 which are paired and the seventh and eighth counter weights C7 and C8 which are paired will be cut simultaneously along their respective outer peripheries in the second process step.

The process described is generalized by a method in which the crankshaft has a plurality of main journals preliminarily machined and a plurality of such pairs of counter weights and which comprises the steps of: a) supporting a first said main journal with a first work rest while cutting such a predetermined first pair of portions with a first such single inside edge cutter to form a first pair of counter weights with their respective outer peripheries machined, and supporting a second said main journal with a second work rest while cutting such a predetermined second pair of portions with a second such single inside edge cutter to form a second pair of counter weights with their respective outer peripheries machined; b) shifting the first work rest to a next first main journal and the first single inside edge cutter to a next first predetermined pair of portions of the workpiece and shifting said second work rest to a next second main journal and said second single inside edge cutter to a next second predetermined pair of portions of the workpiece and thereafter supporting the next first main journal with said first work rest while cutting the next first predetermined pair of portions of the workpiece to form simultaneously a next pair of counter weights of the crankshaft with their respective outer peripheries machined whereas supporting the next second main journal with the second work rest while cutting the next second predetermined pair of portions of the workpiece to form a next pair of counter weights of the crankshaft with their respective outer peripheries machined; and c) repeating the step b) if necessary.

Figure 8:
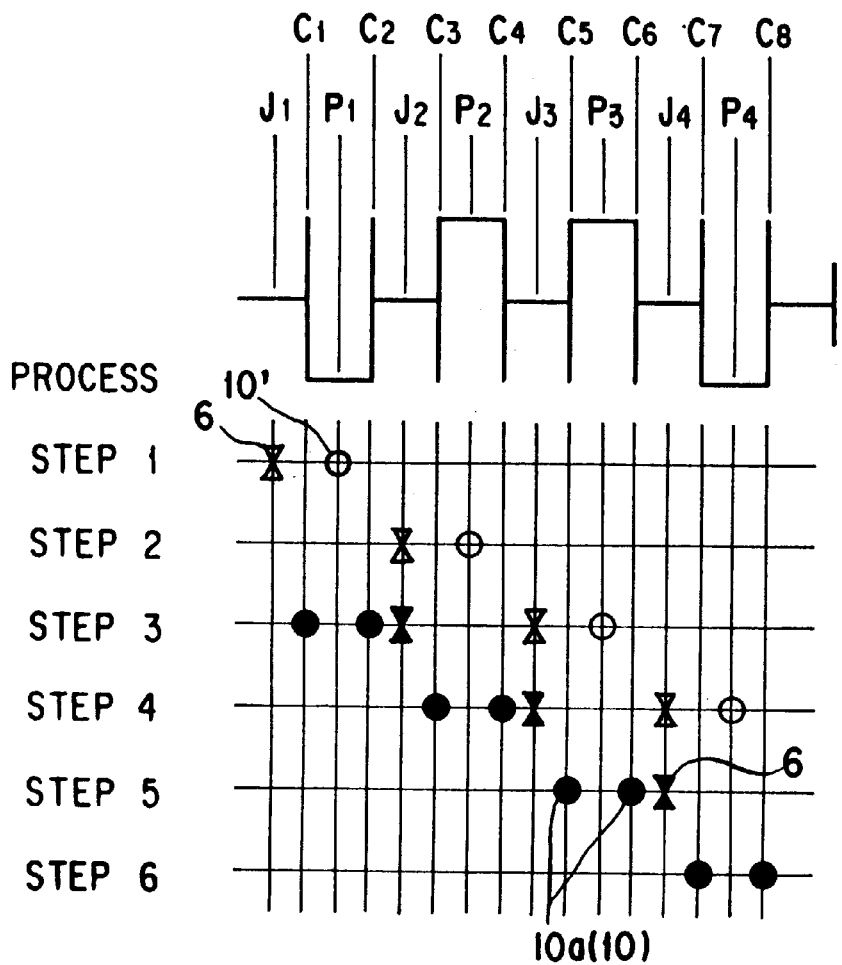
FIG. 8 is an explanatory view that illustrates an operation of the apparatus.
Figure 9:
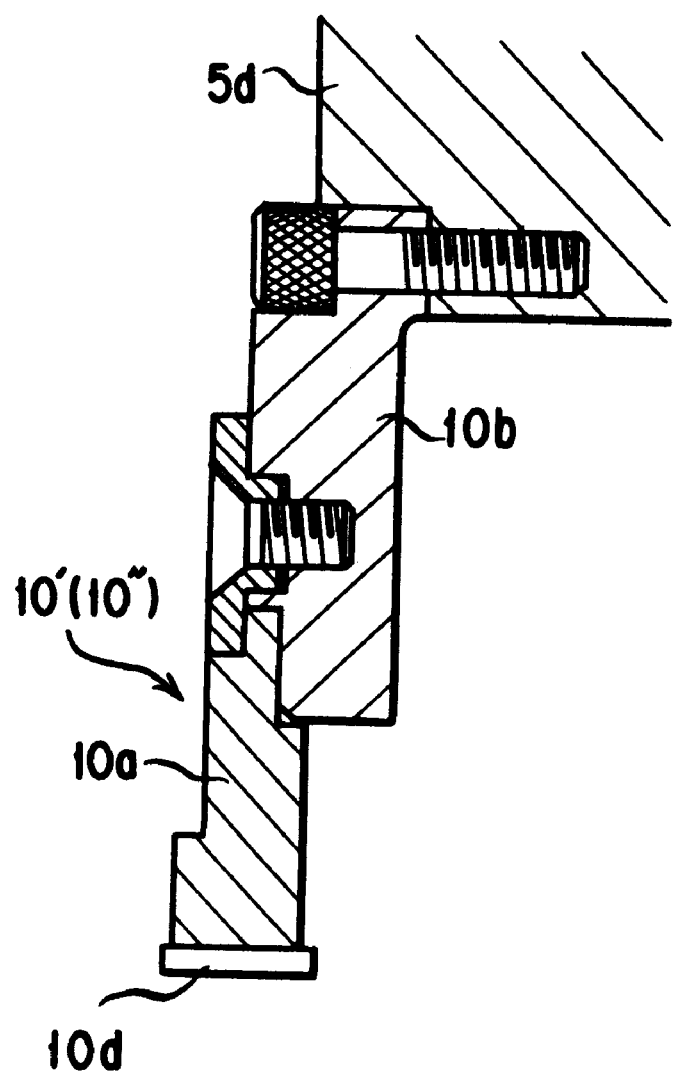
FIG. 9 is a cross sectional view that shows an inside edge cutter that can be provided in the apparatus to cut, machine and form a pin journal or a main journal of a crankshaft in a workpiece.

FIG. 8 illustrates a process in which the right hand side cutter head 5 is rendered active and operative to form a pin journal 3b in the workpiece 3 and the left hand side cutter head 5 is rendered active and operative to form a pair of counter weights 3c in the workpiece 3. Here, the right hand side cutter head 5 has attached thereto a pin journal machining inside edge cutter 10' for forming a pin journal 3b. It should be noted that the pin journal machining inside edge cutter 10' and a main journal machining inside edge cutter 10" as will be described later are each constituted by a cutter adapter 10b detachably secured to the cutter drum 5b and a single cutter member 10a attached to the inner periphery of the adapter 10b, as shown in FIG. 9.

The process described is generalized by a method of machining from a workpiece a crankshaft having pin journals, counterweights and main journals, which method comprises the the steps of: fixedly supporting the workpiece at both ends thereof with a pair of work heads, respectively, which are mounted on a bed; providing a pair of cutter heads between the work heads so that they may be displaceable independently of each other in an axial direction of the workpiece; cutting simultaneously a predetermined pair of portions of the workpiece along their respective outer peripheries so as to simultaneously form a pair of counter weights of the crankshaft along their respective outer peripheries, the counter weights being located at both ends of each pin journal, respectively; and cutting a single predetermined portion of said workpiece so as to form therein at least one of a pin journal and a main journal of the crankshaft along an outer periphery thereof.

Here, a pair of portions of the workpiece are simultaneously cut to form simultaneously a pair of counter weights along their respective outer peripheries by using a single inside edge cutter with a pair of cutter members mounted on a first of said cutter heads and a single portion of the workpiece is cut to form at least one of a pin journal and a main journal of the crank shaft along an outer periphery thereof by using a second inside edge cutter mounted on a second of said cutter heads.

In an exemplary process of FIG. 8, the first step is to allow the first main journal J1 to be supported by the work rest 6 on the right hand side cutter head 5 and the pin machining inside edge cutter 10' to form the first pin journal P1. After the second pin journal P2 has been machined in the second process step, the third process step is carried out permitting the second main journal J2 to be supported by the left hand side work rest 6, rendering the left hand side cutter head 5 active and operative to machine the first and second counter weights C1 and C2 which are paired along their outer peripheries and simultaneously permitting the third main journal J3 to be supported by the right hand side work rest 6 and rendering the right hand side cutter head 5 active and operative to machine the third pin journal P3.

Subsequently, the fourth process step is carried out rendering the left hand side cutter head 5 active and operative to machine the third and fourth counter weights C3 and C4 along their respective outer peripheries and rendering the right hand side cutter head active and operative to machine the fourth pin journal P4. The fifth process step is carried out rendering the left hand side cutter head active and operative to machine the fifth and sixth counter weights C5 and C6 which are paired along their respective outer peripheries. The sixth process step is carried out rendering the left hand side cutter head 5 active and operative to machine the seventh and eighth counter weights C7 and C8 which are paired along their respective outer peripheries.

The process described is generalized by a method in which said crankshaft has a plurality of main journals preliminarily machined and a plurality of such pairs of counter weights, which method comprises the steps of: a) supporting a first said main journal with a first work rest while cutting such a predetermined first pair of portions with the first mentioned, single inside edge cutter to form a first pair of counter weights along their respective peripheries, and supporting a second said main journal with a second work rest while cutting such a predetermined single portion with the second inside edge cutter to form a said pin journal along its outer periphery; b) shifting the first work rest to a next first main journal and the first, single inside edge cutter to a next predetermined pair of portions of the workpiece and shifting the second work rest to a next second main journal and the second inside edge cutter to a next predetermined single portion of the workpiece and thereafter supporting the next first main journal with the first work rest while cutting the next first predetermined pair of portions of the workpiece to form therein a next pair of counter weights of the crankshaft along their respective peripheries whereas supporting the next second main journal with the second work rest while cutting the next predetermined single portion of the workpiece to form a next said pin journal of the crankshaft along its outer periphery; and c) repeating the step b) if necessary.

Figure 10:
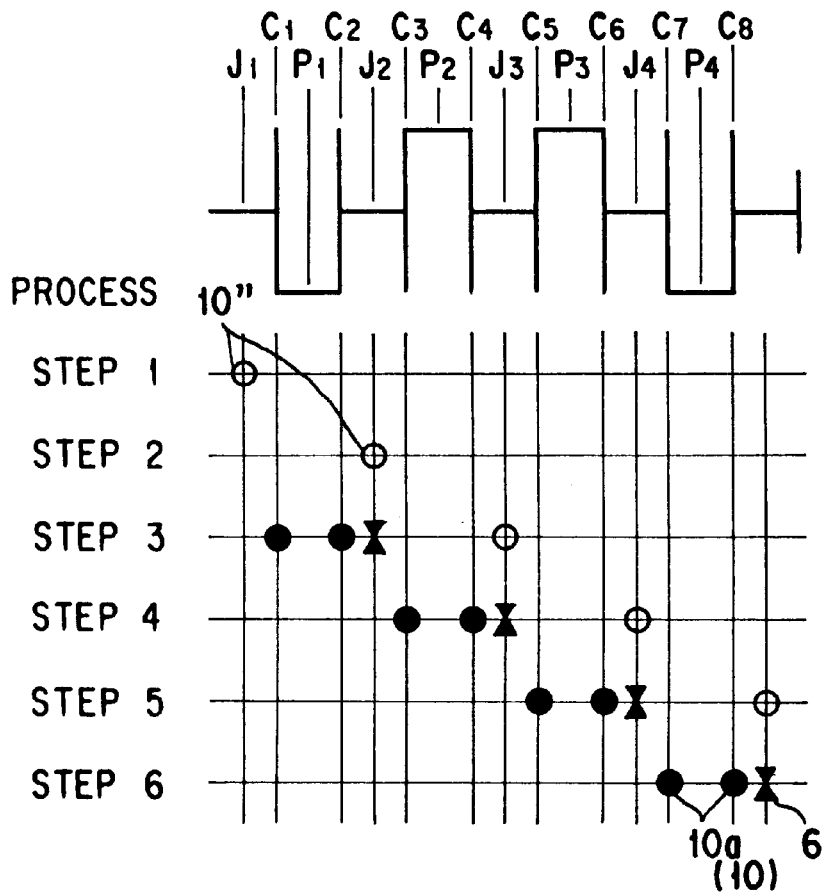
FIGS. 10 and 11 are each an explanatory view that illustrates an operation of the apparatus.
Figure 11:
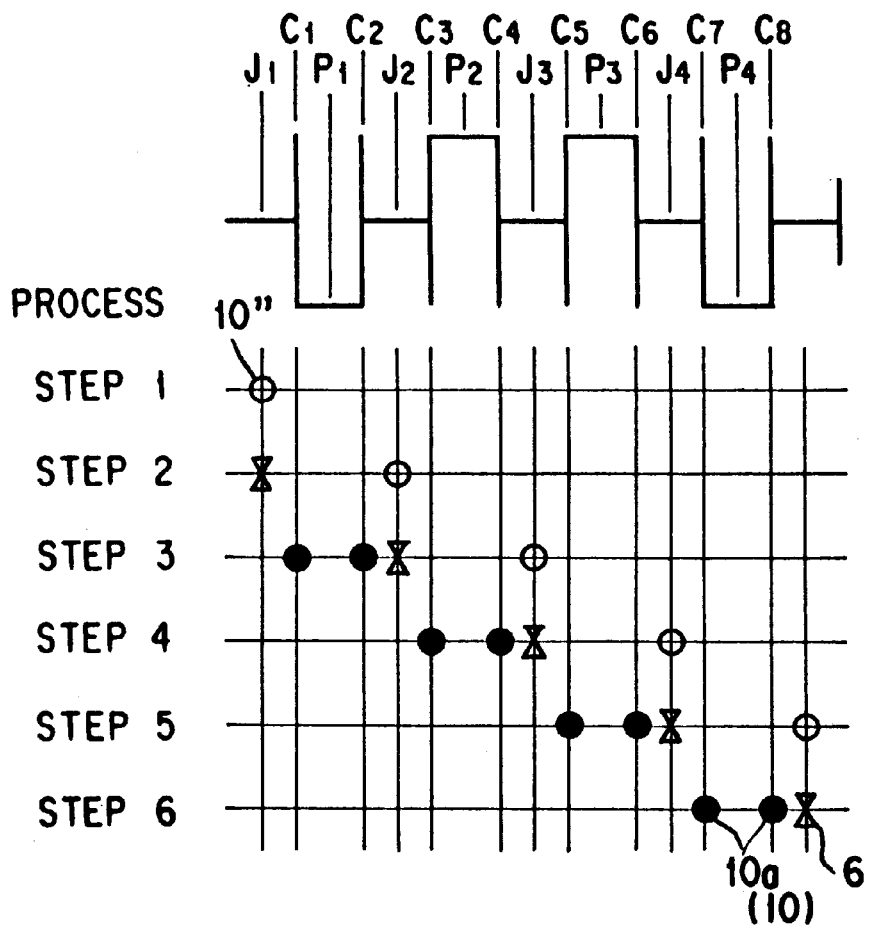

FIGS. 10 and 11 illustrate each a process in which a main journal 3d and a pair of counter weights 3c are simultaneously machined along their respective outer peripheries. In the arrangement used for such a process, the main journal machining inside edge cutter 10'' and the counter weight machining inside edge cutter 10 are carried respectively by the right hand side cutter head 5 and the left hand side cutter head 5 preliminarily. Then, by carrying out the first to sixth process steps, successive combination sets of main journals 3d and pairs of counter weights 3c are each machined simultaneously.

While in each of the embodiments shown the workpiece is designed to be machined successively from the left side end to the right hand side end, the direction may naturally be reversed. Then, for example, the sixth process step can be successively followed, finally by the first process step.

It may also be noted that with a same arrangement of pin journals 3b, main journals 3d and counter weights 3c, the foregoing embodiments can be practiced likewise in preparing a crankshaft for a more than four cylinder engine.

While the present invention has described hereinabove with respect to specific embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope of the appended claims with respect to the features specifically set forth in the all the equivalents thereof.

What is claimed is:

1. A method of machining counter weights of a crankshaft from a workpiece comprising:
   fixedly supporting the workpiece at respective ends thereof with a pair of workheads mounted on a bed;
   operating at least one inside edge cutter to simultaneously cut the workpiece along respective outer peripheral portions thereof so as to simultaneously form a pair of counter weights;
   wherein said at least one inside edge cutter is disposed between said workheads so as to be displaceable in an axial direction of said workpiece; and
   wherein said at least one inside edge cutter comprises a pair of cutter members which are spaced apart from each other by a spacing that is approximately equal to a spacing between said pair of counter weights.

2. The method of machining counter weights of a crankshaft from a workpiece according to claim 1, wherein after said at least one inside edge cutter is operated to simultaneously form a first pair of counter weights, said at least one inside edge cutter is displaced in the axial direction of said workpiece and then operated to simultaneously form a second pair of counter weights.

3. The method of machining counter weights of a crankshaft from a workpiece according to claim 2, wherein said at least one inside edge cutter is operated to form respective pairs of counter weights at respective ends of a plurality of pin journals.

4. The method of machining counter weights of a crankshaft from a workpiece according to claim 2, wherein said workpiece comprises a plurality of preliminarily machined main journals, and a respective one of said main journals is supported by a work rest disposed adjacent to saved at least one inside edge cutter while said at least one inside edge cutter is operated to form a respective one of said pairs of counter weights.

5. A method of machining counter weights of a crankshaft from a workpiece comprising:

fixedly supporting the workpiece at respective ends thereof with a pair of workheads mounted on a bed;

operating first and second inside edge cutters to simultaneously cut the workpiece along respective outer peripheral portions thereof so as to simultaneously form first and second pairs of counter weights, respectively;

wherein said first and second inside edge cutters are disposed between said workheads so as to be displaceable in an axial direction of said workpiece; and wherein said first and second inside edge cutters each comprise a pair of cutter members which are spaced apart from each other by a spacing that is approximately equal to a spacing between the each of the first and second pairs of counter weights, respectively.

6. The method of machining counter weights of a crankshaft from a workpiece according to claim 5, wherein after said first and second inside edge cutters are operated to simultaneously form the first and second pairs of counter weights, respectively, said first and second inside edge cutters are displaced in the axial direction of said workpiece and then operated to simultaneously form third and fourth pairs of counter weights, respectively.

7. The method of machining counter weights of a crankshaft from a workpiece according to claim 6, wherein said first and second inside edge cutters are operated to form respective pairs of counter weights at respective ends of a plurality of pin journals.

8. The method of machining counter weights of a crankshaft from a workpiece according to claim 6, wherein said workpiece comprises a plurality of preliminarily machined main journals, and respective ones of said main journals are supported by work rests disposed adjacent to said first and second inside edge cutters, respectively, while said first and second inside edge cutters are operated to form respective ones of said pairs of counter weights.

* * * * *